June 18, 1935.  A. G. M. MICHELL  2,005,348
NUT, SCREW AND LIKE ARTICLE
Filed May 23, 1932  2 Sheets-Sheet 1
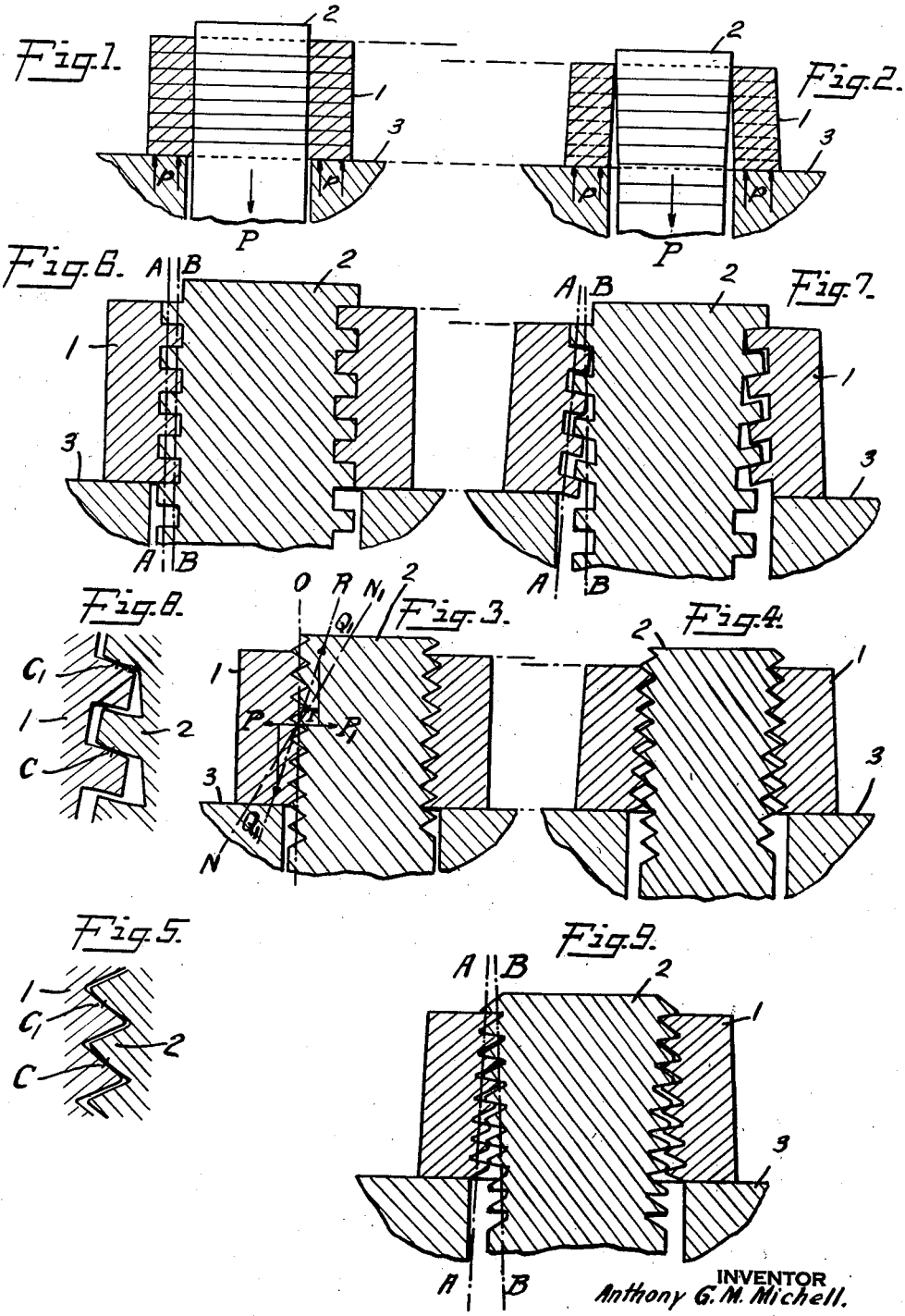
INVENTOR
Anthony G. M. Michell.
BY
Marshall & Hawley
ATTORNEYS

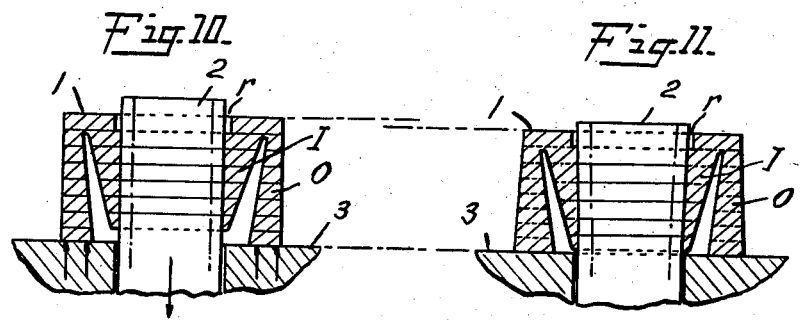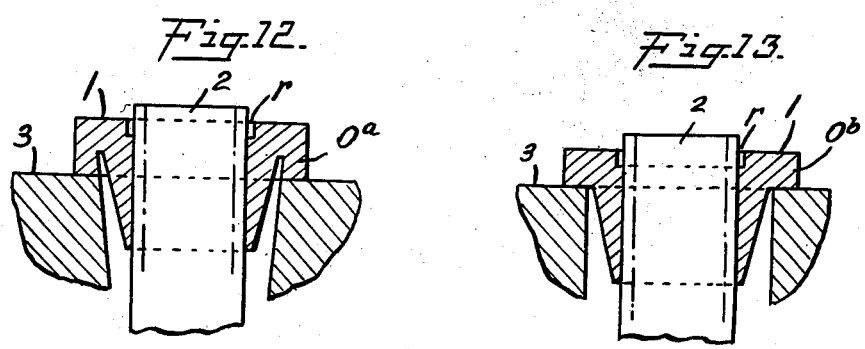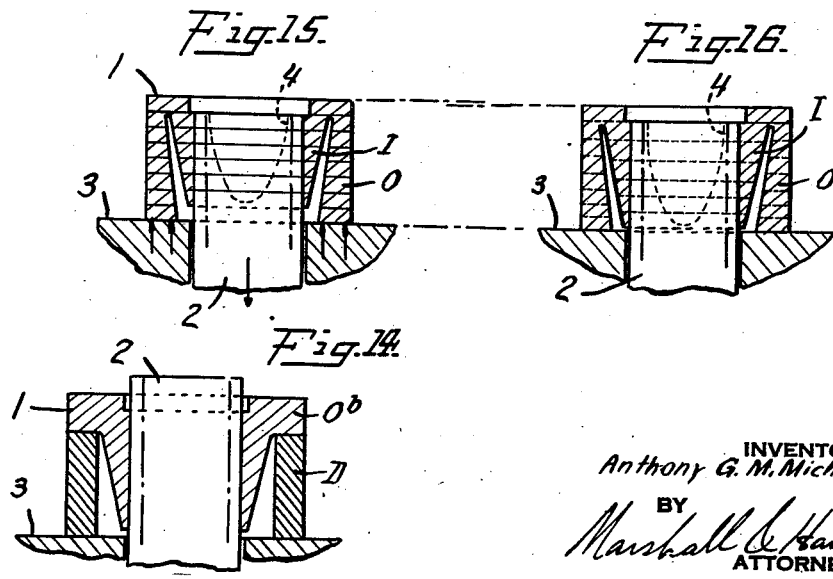

Patented June 18, 1935

2,005,348

UNITED STATES PATENT OFFICE 2,005,348

NUT, SCREW, AND LIKE ARTICLE

Anthony G. M. Michell, Canton, Mass.

Application May 23, 1932, Serial No. 612,918

10 Claims. (Cl. 85—32)

This invention relates to improvements in nuts and similar internally screwed members, and in screws and bolts adapted to be used therewith.

The principal objects sought to be attained by the invention are:

To effect, by improvements in the form of the parts, more favorable distribution than has hitherto been attained of the forces imposed upon the threads and other parts of such nuts, screws, etc.

To reduce the dimensions of and/or the quantity of material necessary in such nuts, screws, etc., by taking advantage of such improved distribution of forces.

To eliminate the well known tendencies of nuts and screws to "slack-back", or unscrew when subjected to varying loads, or to severe vibration while under load, as well as their tendencies to become loose in their thread engagements without, in some cases, actually unscrewing.

Other advantages arising from the application of the invention will appear in the course of the following description. So far as applicant is aware, the common tendency of nuts and screws to unscrew or become loose, though well known, has not hitherto been satisfactorily explained.

In order to make the essential features and scope of the present invention more readily intelligible, its description will be preceded by the explanation of this tendency which the applicant has himself arrived at, this explanation being dependent on detailed consideration of the stresses and deformations which occur in the parts.

The actions involved are somewhat complex and vary in certain features to some extent, as will hereinafter appear, upon the particular form of the thread employed. The principal cause of the slacking of nuts will be shown, however, to be common to all known forms of thread, and will be elucidated with reference to nuts and bolts having threads of various sections. Secondary causes of slacking which augment the effect of the principal cause, will also be explained with reference to illustrative drawings.

As will appear in the following description, the means which serve to prevent slacking are also conducive to more favorable distributions of stress in the parts and consequently permit economies in the use of materials.

In the accompanying drawings,

Figs. 1 and 2 are axial sections of a nut and portion of a bolt engaging therewith shown diagrammatically without regard to the form of their threads. In these two figures the parts are shown respectively in unloaded and loaded condition, the distortion due to load being exaggerated in Fig. 2;

Fig. 3 is a diagrammatic axial section of a nut and a bolt having threads of usual triangular section, shown in the unloaded condition as in Fig. 1;

Fig. 4 is a similar section corresponding to Fig. 2;

Fig. 5 is an enlarged detail of a part of Fig. 4;

Figs. 6 and 7 are diagrammatic sections, corresponding respectively to Figs. 3 and 4, of a nut and bolt having square threads.

Fig. 8 is an enlarged detail of a part of Fig. 7;

Fig. 9 is a section corresponding to Figs. 4 and 7 of a nut and bolt having threads of a special triangular shape;

Figs. 10 and 11 are axial sections corresponding to Figs. 1 and 2, of a nut and bolt which are made according to and embody the invention;

Fig. 12 is a view similar to Fig. 10 illustrating a modified form of nut;

Fig. 13 is a similar view showing another form of nut;

Fig. 14 shows the nut of Fig. 13 used with a collar; and

Figs. 15 and 16 are axial sections similar to Figs. 1 and 2, of a bolt and nut, embodying additional features of the invention.

In the usual mode of application of a nut and bolt, as shown in Figs. 1 and 2, the nut 1 rests upon a supporting surface 3 and is subject to pressure therefrom represented by the arrows $p$—$p$, while the bolt which extends through the supporting surface 3 is subject to an axial tension P. The tension P is equal and opposite to the sum of the pressures $p$—$p$. In the portion of the bolt within the nut, its tensional load P is progressively transferred to the nut through the mutually engaging threads, so that the diminution of the tensile load in each element of the length of the bolt is represented by an equal increment of pressure load in the corresponding element of the nut. At the upper end of the bolt and upper surface of the nut both members are free from axial tension or pressure, the whole of the tensile load P of the bolt being transferred to the nut through the treads at the lower levels.

The tensile stresses in the bolt and the compression stresses in the nut, each corresponding to the load P at the bottom level and progressively diminishing to zero at the top, are of course accompanied by corresponding deformations of extension and contraction whereby the horizontal section lines, which in Fig. 1 represent layers of equal thickness in both bolt and nut, become, as shown on an exaggerated scale in Fig. 2, more widely spaced in the bolt and more closely spaced in the nut. The discrepancy between these deformations in the two members involves, as will be evident, a relative vertical slipping or shearing action at their surfaces of engagement, involving, in general, deformations or fracture of their mutually contacting threads. These effects will be discussed hereinafter with special reference to threads of several different forms.

Another result of the deformations of the two members which is in the main independent of the particular form of their threads, arises from the well known elastic property common to metals and other materials from which bolts and nuts are usually made, whereby every axial deformation of extension or contraction is accompanied by a lateral deformation of the opposite kind. Thus, the bolt while being extended axially contracts laterally, or radially from its axis, and the nut while being compressed axially expands radially, as shown in Fig. 2. Both of these radial deformations, which, like the corresponding axial deformations, are of greatest magnitude at the bottom, and smaller at the upper ends or surfaces of the respective members, are accompanied by further deformations or relative displacements of the engaging threads, as will be more fully explained. In nuts and bolts having threads of the usual triangular section (Seller's, Whitworth, etc.) in which both flanks of the threads are inclined at equal angles to the axis, the deformations above described in connection with Figs. 1 and 2 may take place without fracture, and conceivably without deformation, of the threads, as illustrated in Figs. 3 and 4.

It will be seen from Fig. 4 that radial expansion of the nut and contraction of the bolt (both increasing from top to bottom of these members as already explained) permit, through relative slipping of the contacting threads along their inclined surfaces and without deformation of the profiles of the threads, of the respective axial compressions and extensions of the nut and bolt of which their radial movements are the elastic accompaniments.

In such triangular threads in which the inclinations of the flanks of the threads to planes normal to the axis are usually greater than the frictional "angle of repose" of the materials employed, the radial deformations of the nut and bolt are, moreover, increased by another action which is also illustrated in these Figs. 3 and 4.

Referring to Fig. 3 in which the line $NTN_1$ normal to the flanks of the threads contacting at T makes an angle $N_1TO$ with the axis of the bolt which is greater than the angle of repose $N_1TR$, it will be evident that the resultant forces $TQ_1$, $TQ_1$, acting on the thread of the nut and the thread of the bolt respectively during their mutual slipping, have outward and inward components TP and $TP_1$, tending to expand the nut and compress the bolt radially. Such forces, which act at all such mutually contacting points of the threads, are approximately proportional at each point to the total axial compression and tension of the nut and bolt at the level of the point of contact in question, and consequently increase from top to bottom in the same ratios as the radial deformations which have been previously explained, and which are thus proportionally augmented.

The deformations of profile undergone by such triangular threads is illustrated diagrammatically in Fig. 5. It will be seen that the pressure between contacting triangular threads is concentrated on a helical line of contact (passing through the points $C_1$, C of Fig. 5) and that thereby local crushing and abrasion of the threads, with resulting loosening of the parts, is liable to occur.

As will be seen from comparisons of Fig. 4 with Fig. 3, the displacements and deformations in question are consistent with maintenance of the profiles of these triangular threads without deformation. Actually, however, such deformations necessarily occur in all cases and in such a manner as to facilitate and further augment the prinicpal deformations under discussion. This will be clearly seen from consideration of the action of a bolt and nut having threads of rectangular section, as shown in Figs. 6 and 7.

In this case also, the nut and bolt are subject to general compression and extension more intense in their lower than their upper portions, and these axial deformations are accompanied by radial expansion of the nut and radial contraction of the bolt varying from top to bottom in the same manner. The latter deformations are in this case mainly due to the general transverse deformations of the material, but also to a small extent to radial reactions of the forces on the contacting threads due to the deformations of the profiles of the threads under load.

The general deformations of the nut and bolt are indicated in a greatly exaggerated scale in Fig. 7 by the inclined lines A, A, B, B corresponding to the vertical lines similarly marked in Fig. 6.

As illustrated diagrammatically in Fig. 7, the threads of the nut are compressed in the vertical direction and deflected downwards from root to crest while the threads of the bolt are extended and deflected in the opposite or upward direction. Each of these deformations being of greater magnitude in the lower than in the upper portions of the respective members, it will be readily seen that, in combination with the radial displacements already explained and indicated by the lines A, A, B, B, they permit of the simultaneous vertical contraction of the nut and extension of the bolt which would otherwise be incompatible. It will also be evident that the displacements in question involve relative slipping of the thread of the nut and that of the bolt in radial directions.

In bolts and nuts which are heavily loaded the extent of deformation of the lower threads is frequently so great that they become fractured, or at least permanently deformed on account of the elastic limits of the materials being exceeded, and in such cases the relative radial slipping of the threads subject to high intensities of contact pressure naturally results in abrasion of the contacting surfaces. As the lower threads become abraded, a larger portion of the load is transferred in the course of time to the upper threads, which progressively become worn and loose in like manner. It is, moreover, to be observed that the threads, even though they may be accurately formed in the first instance so as to be uniformly in contact over their contacting surfaces, may become deformed under load so as to be in line contact only. This deformation is illustrated in Fig. 8, the helical line of contact passing through the points $C_1$, C. Such concentration of the load necessarily involves an aggravated rate of abrasion. As the result of these actions the threads will become worn and loose and this effect may occur independently of any unscrewing.

The reverse flanks of the threads (i. e., the lower flanks of the threads of the nut and the upper flanks of the threads of the bolt) are normally free from load and not in mutual contact.

The action of triangular threads of what is known as the buttress type (having the working flanks of their threads normal, or approximately normal, to the axis of the bolt and the opposite sides, which usually carry no load, steeply inclined thereto) is generally similar with respect to the modes and effects of their deformation under load to that of rectangular threads. A nut and bolt having threads of this type is shown in its loaded and deformed condition in Fig. 9.

In this figure the nut and bolt are shown as having two threads, so that the axial section of the threads, unlike the sections shown in the other figures, in each of which the nut and bolt have only single threads, is symmetrical about its axis. The nature and effects of the deformations are, however, independent of this difference.

Although as explained above in connection with Figs. 3 and 4, vertical compression and radial expansion of the nut, together with vertical extension and radial contraction of the bolt are, in the case of triangular threads of the common type having both flanks steeply inclined, mutually compatible independently of any deformation of the profiles of the threads. Actually, however, since all materials are elastic, the sections of the threads will deform under load and such deformation, like the corresponding deformations, in the square and "buttress" threads already described, involves additional relative radial sliding movements of the parts and thus, as already explained in connection with the square and "buttress" threads, conduces to loosening and unscrewing.

In applying the above considerations to explain the tendency of nuts and bolts to unscrew under fluctuating loads, it is to be noted that in undergoing the deformations which have been described the nut in all cases expands radially not only relatively to the bolt 2 but also relatively to the supporting surface 3, unless (which is not usually the case) it happens that the form and material of this surface are such that the loads imposed on it produce the same radial movements as those of the nut at the points of mutual contact. Thus, during any increase or diminution of the load P the mutually contacting surfaces of the nut and its support, as well as those of the contacting threads of nuts and bolt are subject to small radial or oblique sliding movements over one another. If the load P is subject to rapid fluctuations, as is usual (e. g.) in machine parts having reciprocating or oscillating motions, or if the bolt is subject, in addition to a constant load P, to the effects of severe external vibration (as is common in attachments to the frames of machines, and in railroad fastenings, etc.), rapid relative movements will take place between the mutually contacting parts of the nut, and those of its support and of the bolt.

Owing to the helical inclination of the thread there is constantly in action a couple, proportional to the instantaneous value of the load P, tending to turn the nut and bolt relatively to each other about their common axis, i. e., to unscrew them. So long as the load P is constant this couple is resisted by the friction of the mutually stationary contacting parts, but when the effective value of the load P is fluctuating so that relative radial motions are taking place as above described, static friction no longer subsists and, consequently, the nut under the influence of the couple above mentioned, unscrews slightly during each fluctuation.

It may be concluded from the explanation which has been given that the tendency to unscrew will increase with the extent and frequency of the fluctuations of load, and any other causes magnifying the extent of the movements of the nut relatively to its seat or to the threads of the screw. Among such causes are, obviously, want of uniformity of fit of the threads and want of rigidity of either the threads or the seat, due to the use of resilient material or to insufficient dimensions. It will also be apparent that threads of the usual triangular form have, other things being equal, a greater tendency to unscrew under fluctuating loads than those of rectangular or "buttress" profile.

The means by which the slacking of nuts is prevented and by which the other advantageous features set forth in the preamble of this description are realized, consist primarily in giving the nut or other internally screwed member, such form and in supporting it in such manner, that the various parts of it, or at least the threaded parts subjected to considerable stresses, are capable of elongating in the axial direction in a similar manner to the adjacent or corresponding parts of the bolt. In other words, the nut is so formed and supported that the more heavily loaded parts of it, and especially the parts on which the threads are immediately formed are in a condition of general axial tension, (and not in compression, as when the nut is supported in the usual manner as hereinbefore described) and is formed in such a manner that its various parts are under different degrees of stress and engage through the contacting threads with parts of the bolt which are under similar intensities of stress. Figs. 10 and 11 show how these objects may be attained in a nut conforming to usual practice as to its outside dimensions and mode of support, these features being the same as illustrated in Figs. 1 and 2.

According to this invention, the nut I consists of an inner part I on which the thread is formed and an outer part O by which the nut makes contact with its support and on which hexagonal faces may be formed for engagement with the wrench by which the nut is turned. The outer portion O, hereinafter called the shell, alone abuts against the supporting surface 3, the inner portion I, hereinafter called the core, being shorter than the shell (as shown in Fig. 10), so that its lower end is above the level of said supporting surface and consequently out of contact therewith. Alternatively, however, in nuts made for special purposes, the core I may be longer than the shell, provided that an aperture concentric with the bolt is provided in the supporting surface 3 so that the lower end of the core may extend therein without making contact therewith. Such alternative form of nut is shown in Fig. 12 in which the shell is designated by O^a.

The nut shown in Fig. 13 has an abutment portion O^b extending outwardly from the upper or larger end of the core. This may rest directly upon the supporting surface 3, as shown in Fig. 13, or a collar D may be interposed between the abutment portion O^b and the supporting surface 3, as shown in Fig. 14.

The shell and core portions of the nut are connected at their upper ends, being either integral parts of a single piece of material suitably forged or machined, or are pieced originally separate and joined by welding, brazing or like operations, or by mechanical attachment.

It will be understood that in a nut so constructed the core I will be subject to axial tension and will be also axially extended under load, along with the bolt, while the shell will be under axial compression. At the upper end of the core the whole load there transferred to it from the bolt as a tension load is again transferred as a compression load to the shell and the latter is under a uniform compression load which is ultimately imposed at its lower end as a compression load on the supporting surface 3.

The whole, or nearly the whole, of the thread of the nut is preferably formed on the core below its connection with the shell, a shallow recess r being provided at the upper end of the thread. The sectional area of the core taken on a plane transverse to the axis, increases from its lower end where only a small fraction of the tensile load of the bolt has been transferred to it, to the plane of its connection with the shell where the whole or nearly the whole of such load has been transferred, and on each transverse plane the section is made of such area that the extension of the core is as nearly as possible equal to that of the bolt at the same section. If this rule is strictly followed the external profile of the core in axial section will be concave towards the shell and, theoretically, would extend to an indefinite distance from the axis at the upper end. In practice, however, it is sufficient to give the core the form of a truncated cone having a sectional area increasing from nearly zero at its lower end to an area approximating double the sectional area of the bolt at its connection with the shell.

The internal profile of the shell is immaterial provided that its section is sufficient to carry the compression load and the forces to which it is subjected by the wrench. At its lower end, however, the bearing surface by which the shell makes contact with the supporting surface must be sufficiently great to prevent serious abrasion when the nut is turned and to ensure that under load the secondary or radial extension of the shell on the surface of contact approximates to the similar extension of the supporting surface.

The relative dimensions of the parts necessary to secure these results, will of course, vary with the materials employed, and are determined either by calculation or by trial.

In cases where the most complete immunity from slacking back is required, it is desirable, for the reasons which have been explained above in connection with Figs. 3 and 4, to avoid the use of thread profiles whose angles on their loaded sides exceed the angle of repose of the materials and to employ in preference buttress threads, as shown in Fig. 9, or rectangular threads, as shown in Figs. 6 to 8.

As a further refinement, the sectional area of the bolt may be progressively reduced from the plane passing through the lower end of the core of the nut to the plane passing through the uppermost threads of the nut by forming in the threaded portion of the bolt a conoidal hollow 4, as shown in Fig. 15. The sectional area of the bolt being thus made proportional at each section to the tension load, the specific extension of the material will be uniform. In such case the profile of the core of the nut is to be made such that the total sectional areas of the bolt and nut if of similar material are constant throughout. This is shown in Fig. 16 in which the parts are shown under load, and it will be readily understood that in this case a series of equidistant horizontal section lines traversing both the unloaded bolt and nut core, as shown in Fig. 1, and by full lines in Fig. 15, will remain horizontal and equidistant, though they will become more widely spaced after application of the load, as shown by the dotted lines in Fig. 16.

It will also be understood that with this construction there are no differential deformations between the bolt and the core of the nut and consequently no tendency for slacking to take place while the amount of material in the parts is the least possible since they are each uniformly stressed throughout.

What I claim is:

1. A nut having a threaded bore, and having a recess surrounding the bore inclined to the axis of the bore combined with a threaded bolt having a recess therein substantially coextensive with the threads of the nut, the walls of said recess in the bolt being inclined in the same direction as the inclination of the recess in the nut.

2. A nut comprising a tapered core having a threaded bore, and a shell connected with the larger end of the core extending around the core toward the smaller end thereof combined with a threaded bolt having a tapered recess therein substantially coextensive with the core.

3. A nut comprising a tapered core having a threaded bore, and a shell connected with the larger end of the core extending around the core toward the smaller end thereof, said shell increasing in thickness away from its connection with the core combined with a threaded bolt having a tapered recess therein substantially coextensive with the core.

4. A nut comprising a tapered core having a threaded bore, and a shell connected with the larger end of the core extending around the core toward the smaller end thereof and beyond the smaller end of the core combined with a threaded bolt having a tapered recess therein substantially coextensive with the core.

5. A nut comprising a tapered core having a threaded bore, and a shell connected with the larger end of the core extending around the core toward the smaller end thereof and beyond the smaller end of the core increasing in thickness away from its connection with the core combined with a threaded bolt having a tapered recess therein substantially coextensive with the core.

6. A nut having a tapered threaded core and an abutment portion secured to the larger end of the tapered core and held against longitudinal movement relative thereto, said abutment portion being spaced from the core throughout the length thereof, and said core being longitudinally extensible under stress.

7. A nut comprising a tapered core threaded throughout its length and a shell connected with the larger end of the core by a nonyieldable connection extending toward the smaller end thereof around the core and beyond the smaller end of the core and gradually increasing the thickness from one end to the other thereof and away from its connection with the core.

8. In combination, a nut and a bolt, the bolt being constructed with a conoidal recess extending axially into the nut and the nut comprising an internally threaded tapered core, such that the difference between the radii from the axis of the bolt to the wall of the bolt recess and from the bolt axis to the tapered wall of the core will be substantially constant throughout the length of the threaded portion of the nut, and an abutment portion extending from the larger end of the core toward the smaller end thereof.

9. In combination, a nut and a bolt, the bolt being constructed with a conoidal recess extending axially into the nut and the nut comprising an internally threaded tapered core, the difference between the radii from the axis of the bolt to the wall of the bolt recess and from the bolt axis to the tapered wall of the core being substantially constant throughout the length of the threaded portion of the nut, and an external shell surrounding the core and connected to the larger end thereof.

10. An internally threaded member coacting with an externally threaded member, said internally threaded member being threaded substantially throughout its length and the threaded portion of said internally threaded member having a cross sectional area greater toward one end than at the other end thereof and said externally threaded member having a cross section decreasing in area toward the outer end thereof.

ANTHONY G. M. MICHELL.